United States Patent [19]
Yanagihara

[11] Patent Number: 6,028,726
[45] Date of Patent: *Feb. 22, 2000

[54] DIGITAL DATA RECORDING/ REPRODUCING APPARATUS AND METHOD WITH MEANS FOR ADDING ARRIVAL TIME TO A DATA PACKET

[75] Inventor: Naofumi Yanagihara, Tokyo, Japan

[73] Assignee: Sony Corporation, Tokyo, Japan

[ * ] Notice: This patent is subject to a terminal disclaimer.

[21] Appl. No.: 08/929,744

[22] Filed: Sep. 15, 1997

Related U.S. Application Data

[63] Continuation of application No. 08/556,492, Nov. 13, 1995, abandoned.

[30] Foreign Application Priority Data

Nov. 14, 1994 [JP] Japan .................................. 6-304421
Jan. 27, 1995 [JP] Japan .................................. 7-031685

[51] Int. Cl.$^7$ .............................. G11B 5/09; H04N 5/783
[52] U.S. Cl. .................................. 360/48; 360/51; 386/81
[58] Field of Search ................................................ 360/48

[56] References Cited

U.S. PATENT DOCUMENTS

| | | | |
|---|---|---|---|
| 5,377,051 | 12/1994 | Lane et al. .................................. | 386/81 |
| 5,546,244 | 8/1996 | Park et al. .................................. | 360/53 |
| 5,561,652 | 10/1996 | Fujiwara et al. ........................... | 369/59 |
| 5,845,042 | 12/1998 | Yanagihara ................................ | 386/81 |
| 5,845,043 | 12/1998 | Yanagihara ................................ | 386/109 |

FOREIGN PATENT DOCUMENTS 0 049 652  4/1982  European Pat. Off. .

OTHER PUBLICATIONS

Riemann U: "Der MPEG–2–Standard Generische Codierung fur Bewegtbilder und Zugehoriger Audio–Information. Multiplex–Spezifikation for die Flexible Ubgertragung Digitaler Datenstrome" Fernseh und Kinotechnik, vol. 48, No. 10, Oct. 1, 1994, pp. 545–550, 553, XP000468290.

Riemann U: "Der MPEG–2–Standard. Multiplex–Spezifikation Fur Die Flexible Ubertragung Digitaler Datenstrome" Fernseh Und Kinotechnik, vol. 48, No. 9, Sep. 1, 1994, pp. 460–462, 464–468, XP000468751.

*Primary Examiner*—W. Chris Kim
*Attorney, Agent, or Firm*—Frommer Lawerence & Haug, LLP.; William S. Frommer

[57] ABSTRACT

A digital VTR is capable of reproducing a recorded picture image in a normal mode and a variable speed reproduction mode. During normal speed reproduction, the digital VTR reproduces a recorded picture from data that has been recorded in a normal play area of a recording medium. When the digital VTR is in a variable low speed reproduction mode, it reproduces a picture from data recorded in a first trick play area. When the digital VTR is in a variable high speed reproduction mode, it reproduces a picture from data recorded in a second trick play area. The first and second trick play areas are located at respective tracks that correspond to different azimuths.

26 Claims, 18 Drawing Sheets

Fig. 10
| | | TP1 (18x) | TP2 (4x) |
|---|---|---|---|
| 2*1HEAD/9000rpm | SPEED LOCK | ±1.5x, 2.5x, 3.5x,···,8.5x | NA |
| | PHASE LOCK | +18x/−16x | +4x/−2x |
| 1*2HEAD/9000rpm | SPEED LOCK | ±1.5x, 2.5x, 3.5x,···,8.5x | NA |
| | PHASE LOCK | +18x/−16x | +4x/−2x |
| 2*2HEAD/4500rpm | SPEED LOCK | ±1.5x, 2.5x, 3.5x,···,8.5x | NA |
| | PHASE LOCK | NA | +4x/−2x |
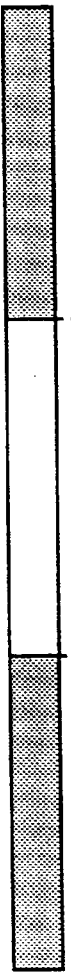
Fig. 12A
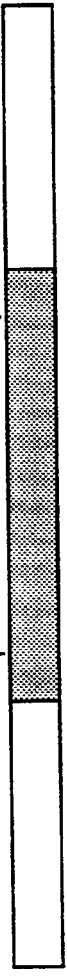
Fig. 12B

Fig. 13A

| | T0 | T1 | T2 | T3 |
|---|---|---|---|---|
| ECC 3 (RESERVE) | 9SB | 9SB | 9SB | 9SB |
| NORMAL PLAY AREA | 101SB | 101SB | 101SB | 126SB |
| TRICK PLAY AREA — TP1 | 25SB | — | 25SB | — |
| TRICK PLAY AREA — TP2 | — | 25SB | — | — |

Fig. 13B

| | SBNo. FOR TP | | | | | ECC 3 | TRACK |
|---|---|---|---|---|---|---|---|
| TP1 (18×) | No.40-44 | No.62-66 | No.84-88 | No.106-110 | No.128-132 | No.147-155 | T0 |
| TP2 (5×) | | No.38-62 | | | | No.147-155 | T1 |
| TP1 (18×) | No.40-44 | No.62-66 | No.84-88 | No.106-110 | No.128-132 | No.147-155 | T2 |
| TP2 (5×) | | | | | | No.147-155 | T3 |

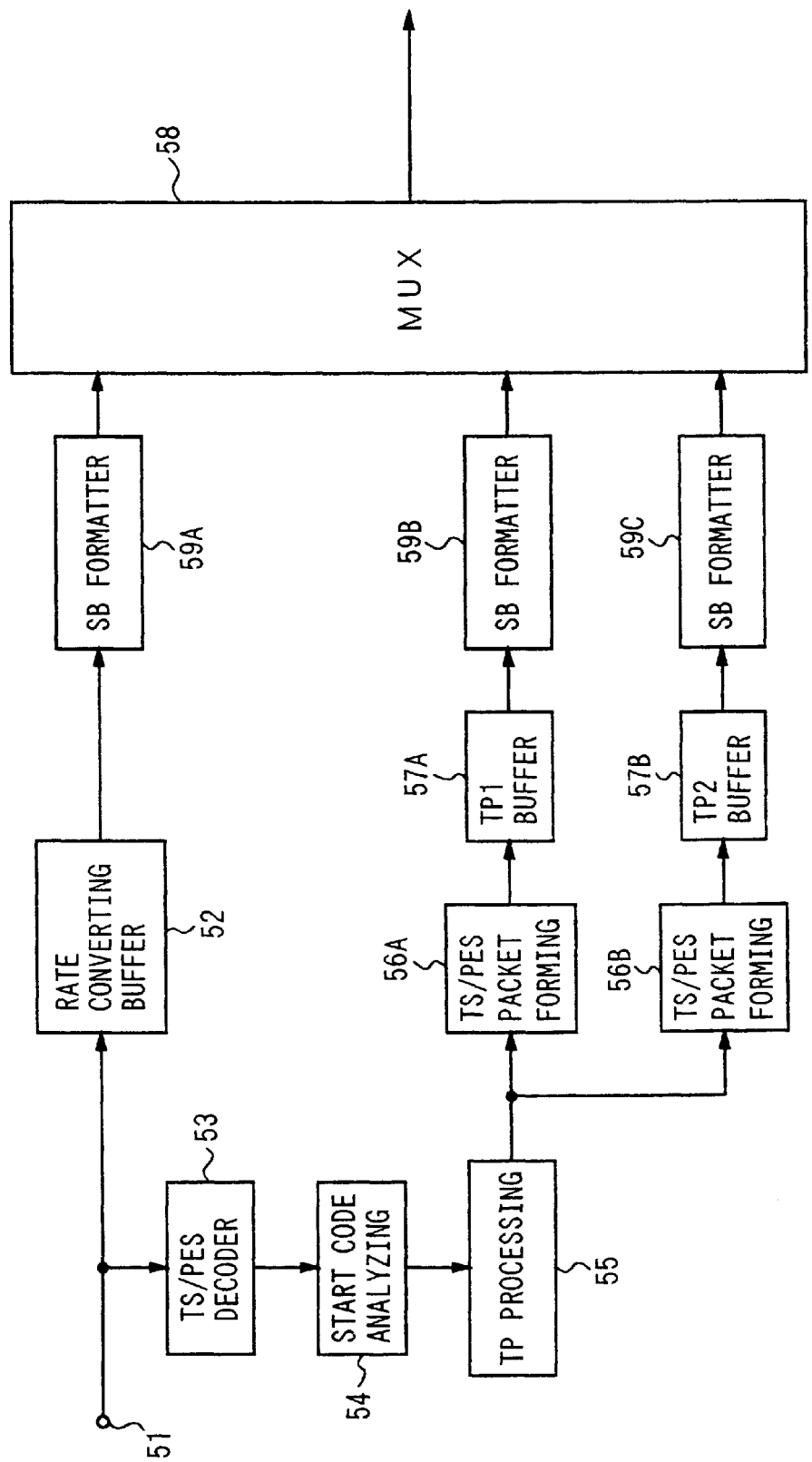

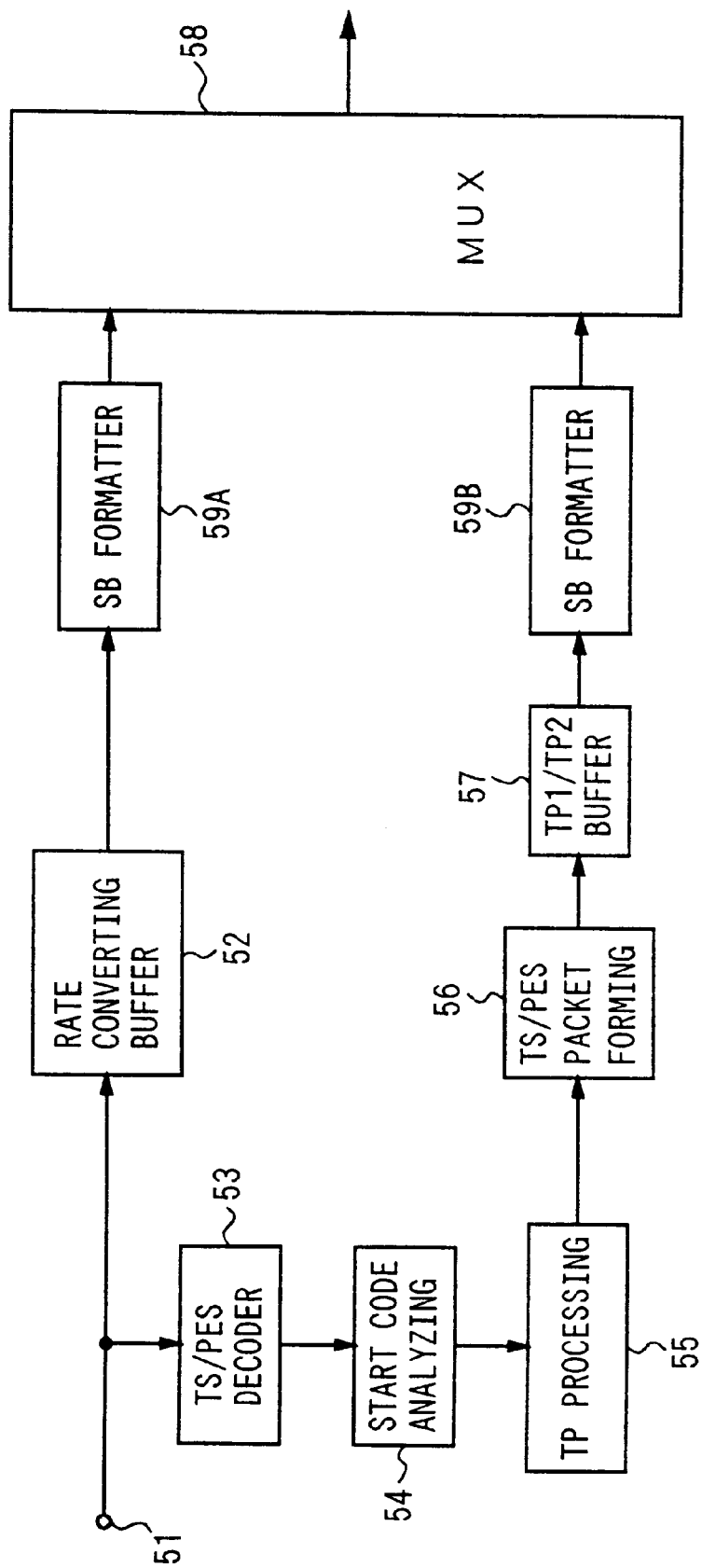

DIGITAL DATA RECORDING/ REPRODUCING APPARATUS AND METHOD WITH MEANS FOR ADDING ARRIVAL TIME TO A DATA PACKET

This application is a continuation of application Ser. No. 08/556,492, filed Nov. 13, 1995, now abandoned.

FIELD OF THE INVENTION

This invention relates to a variable speed recording and reproducing system for use in a digital VTR, and in particular, to a variable speed recording and reproducing system that performs a data rate conversion on program data prior to recording and that reconstructs the original time base information of the rate converted program during reproduction. The variable speed recording and reproducing system of the present invention is particularly suitable for recording video signals that are organized in accordance with the MPEG2 format.

BACKGROUND OF THE INVENTION

In a previously proposed digital VTR, a digital video signal is recorded onto a magnetic tape after it is first compressed in accordance with a DCT (Discrete Cosine Transform) technique and recorded in accordance with a variable length encoding technique. Such a digital VTR is capable of recording video signals in two different modes. In a first mode, the digital VTR records the well-known NTSC television broadcast signal, or the like. This mode is referred to herein as an SD mode, in which the video signal is recorded at a rate of 25 Mbps. In a second recording mode, the digital VTR records an HDTV signal. This second mode is referred to herein as the HD mode, in which the video signal is recorded at a rate of 50 Mbps. Techniques for recording what is referred to as a transport packet, which is formatted as an MPEG2 signal, are currently being proposed.

The MPEG2 format allows a plurality of different programs to be transmitted as a time division multiplexed encoded data stream. The fundamental data structure for organizing and conveying these multiplexed programs to their respective destinations is referred to as a transport packet.

Each transport packet has a fixed length of 188 bytes, and it comprises a header portion and a payload portion. The data of the header portion identifies the content of the transport packet. The digital VTR uses this header portion to select a designated program from the multiplexed program data stream.

FIGS. 22A–22D illustrate the contents of the transport packet. As shown in FIG. 22A, every transport packet includes a header portion followed by a payload portion. The payload portion corresponds to the contents of the video program. As shown in FIG. 22B, the header comprises: a sync code of eight bytes; a transport error indicator which indicates the presence or absence of errors in a packet; a payload unit start indicator which indicates the start of a payload unit; a transport priority code which indicates the importance of a corresponding packet; a packet identification (PID) code which indicates a particular attribute of the packet; a transport scramble control code which indicates whether the data of the payload portion has been scrambled; an adaptation field control code which indicates the presence or absence of an adaptation field; a cyclic counter that determines whether a part of the packet has been abandoned midway during transmission; and an adaptation field to which either additional identifying information or dummy bytes can be inserted.

As shown in FIG. 22C, the adaptation field is composed of several codes. The first code is an adaptation field length code that indicates the data length of the adaptation field. The next code is a discontinuous indicator code that changes its contents to indicate that a system clock has been reset. Following the discontinuous indicator code is a random access indicator code that indicates an entry point for random access. The random access indicator code is followed by a priority stream elementary indicator code that designates a portion or the entirety of the payload portion as important. The final portion of the adaptation field is designated as an optional field.

As shown in FIG. 22D, the optional field is composed of several codes. These codes are a PCR, an OPCR, a splice count down, a transport private data length and transport private data, an adaptational field extension length, and an optional field. The PCR code includes a time stamp for setting and calibrating a time value. A Phase Locked Loop (PLL) uses the PCR code to generate a system clock of 27 MHz, for instance. In order to accurately decode and reproduce the program data, the corresponding time base stored in the PCR field must be maintained with as little deviation as possible.

FIGS. 23A and 23B illustrate the manner in which an MPEG2 transport packet is recorded by the previously proposed digital VTR. A desired program (for example, program A) is selected from a time-division multiplexed data stream of programs A, B, and C. Assuming that a data rate of programs A, B, and C is equal to, for example, 30 Mbps and a substantial rate of the selected program is equal to 10 Mbps, a rate conversion from 30 Mpbs to 10 Mbps is executed in a rate converting buffer.

FIG. 24 illustrates such a rate converting buffer 102. The transport packet of the selected program is supplied to an input terminal 101 of rate converting buffer 102, which reduces the input program data rate to ⅓ of its original value. Thus, the rate is reduced from 30 Mbps to 10 Mbps. The rate converted transport packet is supplied from an output terminal 103 to a digital VTR.

Since a recording rate in the SD mode of the digital VTR is equal to 25 Mbps, by performing the rate conversion as mentioned above, the transport packet can be recorded as it is by the digital VTR.

By performing the above-discussed rate conversion to the selected program, the previously proposed digital VTR system also changes the time base of the selected program. Nevertheless, since the PCR code of the selected program still reflects the time base of the program before it was rate converted, a subsequent decoding operation that relies on this inaccurate PCR code will result in a poor reproduction of the rate-converted video signal.

The MPEG2 format provides for three frames of data: an I frame which was intra-frame encoded, a P frame which was forward direction prediction encoded, and a B frame which was bi-directionally prediction encoded. In a variable speed reproducing mode, since the reproducing head does not traverse the entire length of each track, the data of the continuous frames cannot be obtained. Thus, the data of the P and B frames cannot be decoded. Only the data of the I frame which was intra-frame encoded can be decoded. Therefore, only the data of the I frame is used in the variable speed reproducing mode of the previously proposed digital VTR system.

However, when the transport packet is supplied to the digital VTR for recording, the packets that include the I frame cannot be obtained entirely in the variable speed reproducing mode. A positional relation in which the data of the I frame has been recorded is uncertain. Therefore, the data of the I frame corresponding to a specific portion of a picture plane is dropped out at the time of the variable speed reproduction and a picture quality in the variable speed reproducing mode deteriorates.

OBJECTS AND SUMMARY OF THE INVENTION

It is, therefore, an object of the invention to provide a digital data recording/reproducing apparatus and method which can correctly reconstruct a time base of an original transport packet from a transport packet that has been recorded as a rate converted signal.

Another object of the invention is to provide a digital data recording/reproducing apparatus and method that uses a variable speed reproduction mode, which does not degrade the quality of a picture reproduced from data of a rate converted transport packet.

Still another object of the invention is to provide a digital data recording apparatus that comprises a time generating means for determining on the basis of a reference clock when a data packet is received, and means for time stamping the received data packet with this arrival time.

A further object of the invention is to provide a digital data reproducing apparatus for reproducing a data packet recorded on a tape, characterized in that a time base is managed on the basis of an arrival time added to the data packet.

Another object of the invention is to provide a digital data recording apparatus for recording a data packet onto a tape, in which the apparatus comprises means for organizing the track on the tape into a normal play area and a trick play area. The trick play area is located at various reproducible areas on the track that the head traces when the apparatus is in a maximum variable reproducing speed mode. The apparatus also includes means for recording the data packet into the normal play area and for recording into the trick play areas during variable speed reproduction a portion of the data packet. The apparatus further includes means for reproducing the data recorded in the normal and trick play areas.

When a program is selected from the transport packet and is rate converted and recorded, the arrival time information of the packet is added to each packet in order to reconstruct the time base information of each packet. This time information is generated on the basis of a reference clock. Upon reproduction, the same time base state as that upon inputting is reconstructed on the basis of the time information.

As for the packets to which the time information was added, the relation between the number of sync blocks and the number of packets in which sync blocks are recorded is set to an integer ratio.

In the recording and reproduction of the digital VTR, since the rotation of the drum is synchronized with the reference clock, the time base information of the data packets can be preserved during recording and reproduction.

The present invention uses two trick play areas; they are designated TP1 and TP2. Trick play area TP1 is used during high speed variable speed reproduction, and trick play area TP2 is used during low speed variable speed reproduction. Trick play areas TP1 and TP2 are arranged in tracks of different azimuths, respectively. The data of the I frame is recorded in the trick play areas TP1 and TP2. By using the data recorded in the trick play areas TP1 and TP2, the picture quality can be improved during variable speed reproduction. Furthermore, the operation of the present invention is not constrained by any particular recording head arrangement because the trick play areas are each arranged in tracks of different azimuths, respectively, and because only the tracks corresponding to one azimuth (and to one of the trick play areas) is used either in the low or high speed variable speed reproduction mode.

BRIEF DESCRIPTION OF THE DRAWINGS

The following detailed description, given by way of example and not intended to limit the present invention solely thereto, will best be understood in conjunction with the accompanying drawings in which:

FIG. 10 illustrates the various tape speeds that can be realized during a variable speed reproduction mode.

FIGS. 12A and 12B illustrate the portions of each track that are traced by each scanning operation in a variable speed reproduction operation;

FIGS. 13A and 13B show an arrangement of sync blocks in each recording track;

FIG. 14 illustrates a first embodiment of a recording apparatus that records variable speed reproduction data into trick play areas;

FIG. 15 illustrates a second embodiment of a recording apparatus that records variable speed reproduction data into trick play areas;

DETAILED DESCRIPTION OF INVENTION

Figure 1:
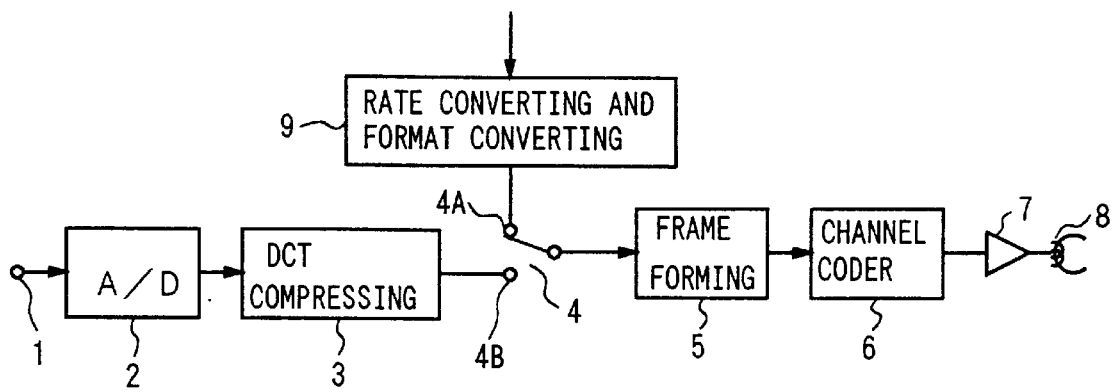
FIG. 1 illustrates a digital VTR recording system of the present invention.

FIG. 1 illustrates a recording system of a digital VTR Reference numeral 1 denotes an input terminal for receiving an analog video signal, such as an NTSC television signal or the like. For purposes of this discussion, this video signal will be referred to as a standard video signal. This video signal is supplied to an A/D converter 2 which converts the received analog video signal to a digital video signal.

A/D converter 2 supplies the converted video signal to a DCT compressing circuit, which compresses the input video signal in accordance with a DCT compression technique and variable length encoding. In particular, the video signal from the A/D converter 2 is divided into blocks which are shuffled and subjected to the DCT conversion. The DCT converted data is buffered on a predetermined buffer unit basis. The DCT compressing circuit employs a buffer unit in accordance with a quantization table such that the total code amount is equal to or less than a predetermined value. The data is quantized by such an optimum quantization table and is variable length encoded and is framed.

The output of DCT compressing circuit 3 is then supplied to terminal 4B of switching circuit 4. Switch 4 also includes terminal 4A, to which a digital video signal transport packet encoded in the MPEG2 format is supplied after this signal is rate converted by rate converting and format converting circuit 9.

The rate conversion and format converting unit 9 converts the rate of the MPEG2 signal from, for example, 30 Mbps to 10 Mbps. Further the data in the trick play areas (which will be explained later) is arranged in order to obtain a preferable picture plane upon variable speed reproduction. The recording system of FIG. 1 sets the switching circuit 4 to terminal 4B in order to record the video signal supplied to input terminal 1; when the system records the MPEG2 transport packet, it sets the switching circuit to terminal 4A.

The output of the switching circuit 4 is supplied to a frame forming circuit 5, which organizes the recording data into predefined frames and executes an error correction coding process.

The output of the frame forming circuit 5 is supplied to a channel coder 6, which modulates the received data. The channel coder 6 supplies the modulated signal to a rotary head 8 through a recording amplifier 7. The compressed video signal or the transport packet of the MPEG2, depending on which switching terminal the switching circuit 4 was set to, is recorded on a magnetic tape by the rotary head 8.

When the MPEG2 transport packet is to be recorded, switching circuit 4 is switched to terminal 4A. By doing so, the MPEG2 transport packet is divided into frames by frame forming circuit 5, modulated by channel coder 6, and recorded onto the magnetic tape by rotary head 8.

When the standard video signal is to be recorded, switching circuit 4 is switched to terminal 4B. By doing so, the standard video signal is compressed by DCT compressing circuit 3, divided into frames by frame forming circuit 5, modulated by channel coder 6, and recorded onto the magnetic tape by rotary head 8.

As mentioned above, recording an MPEG2 transport packet signal first requires rate converting and format converting circuit 9 to select a program (encoded in the MPEG2 format) from the plurality of time division multiplexed programs that normally are supplied thereto, for recording on a record medium (e.g., a magnetic tape). This circuit then converts the data rate of the selected program from, for example, 30 Mbps to 10 Mbps. The rate conversion also alters the time base information of the MPEG2 program. Thus, upon reproduction the original time base information of the recorded MPEG2 program cannot be retrieved from the program itself because of this rate conversion.

In order to remedy this situation, the present invention adds to each transport packet time information that indicates the packet arrival time. This addition is made before each transport packet is supplied to the rate converting and format converting circuit 9 for recording on the record medium. The added time information is recorded onto the magnetic tape along with each transport packet. During reproduction of the recorded transport packets, the system of the present invention extracts each packet's associated time information in order to obtain each packet's original time base information.

Figure 2:
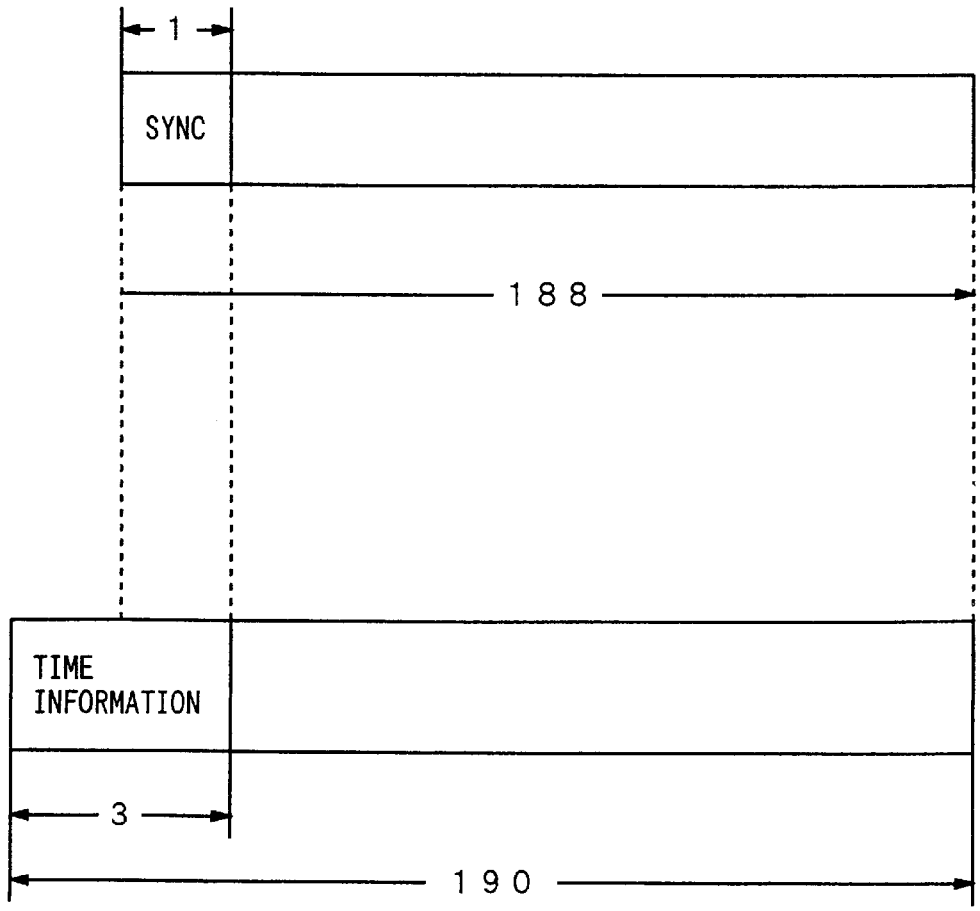
FIG. 2 illustrates the data format of a transport packet.

FIG. 2 illustrates the data format of a transport packet and the associated time information. As stated with respect to FIGS. 17A and 17B, prior to rate conversion, each header of every transport packet begins with a sync code of 8 bytes. In order to provide space for the time information, which comprises 3 bytes, the rate converting and format converting circuit 9 removes one byte from the sync code and adds the three byte time information code to the beginning of the header portion. Thus, after this procedure is accomplished, each transport packet will comprise 190 bytes.

Figure 3:
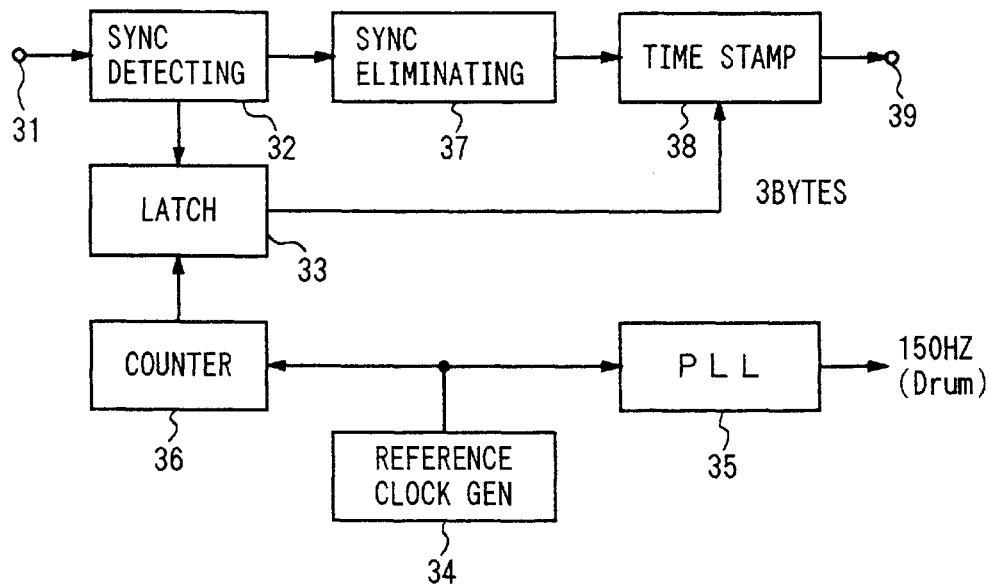
FIG. 3 illustrates a circuit for adding the time information to a transport packet.

FIG. 3 illustrates a circuit for adding the time information of three bytes before the transport packet is recorded. In FIG. 3, the transport packet is first supplied to sync detecting circuit 32. The sync detecting circuit 32 detects the sync code at the head of the transport packet. A detection output of the sync detecting signal is supplied to latch 33. A second output of the sync detecting circuit 32 is supplied to a sync eliminating circuit 37. When the sync code is detected, the sync eliminating circuit 37 eliminates one byte of the sync code. An output of the sync eliminating circuit 37 is then supplied to a time stamp circuit 38.

A reference clock generator 34 generates a reference clock with a frequency of, for example, 27 MHz. This reference clock signal is supplied to a Phase Locked Loop (PLL) 35 and to a counter 36. The drum to which the head 8 is attached is rotated at, for example, 150 Hz on the basis of the output of the PLL 35.

The reference clock signal is counted by the counter 36, from which time information is derived. This derived time information is supplied to latch 33. The time stamp circuit 38 adds the 3 bytes of time information to the transport packet and supplies this modified packet to output terminal 39 for recording.

Figure 4:
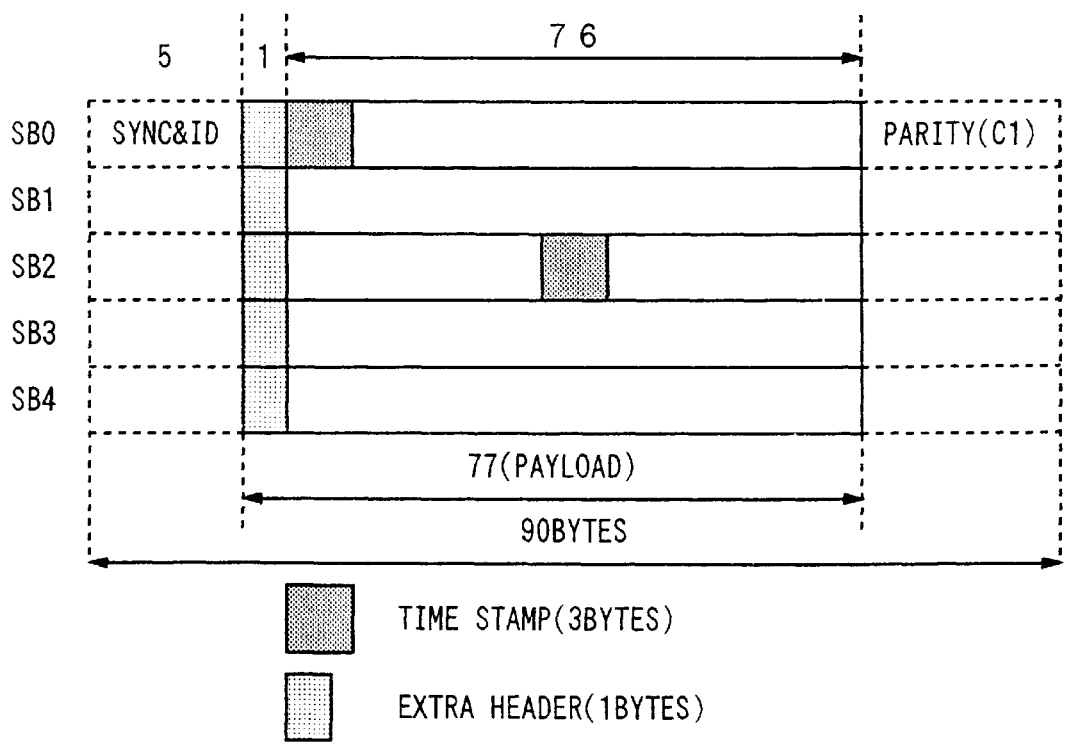
FIG. 4 illustrates a plurality of transport packets organized into a plurality of sync blocks.

FIG. 4 illustrates the data organization of two transport packets, each one including a time stamp of 3 bytes as indicated by the darkly shaded blocks. These two transport packets are organized into 5 sync blocks SB0–SB4. An extra header, indicated by the lightly shaded blocks, is added to each sync block. The solid lines indicate the transport packets. Each extra header includes a serial number, or the like. The dotted lines in FIG. 4 indicate a sync and ID code (added to the beginning of each sync block), and a parity (C1) code (added to the end of each sync block). Thus, each sync block begins with the sync and ID code of 5 bytes. The next 72 bytes of each sync block (including the extra header) comprises the payload portion of the sync block. Each sync block then concludes with a parity (C1) code of eight bytes.

Figure 5:
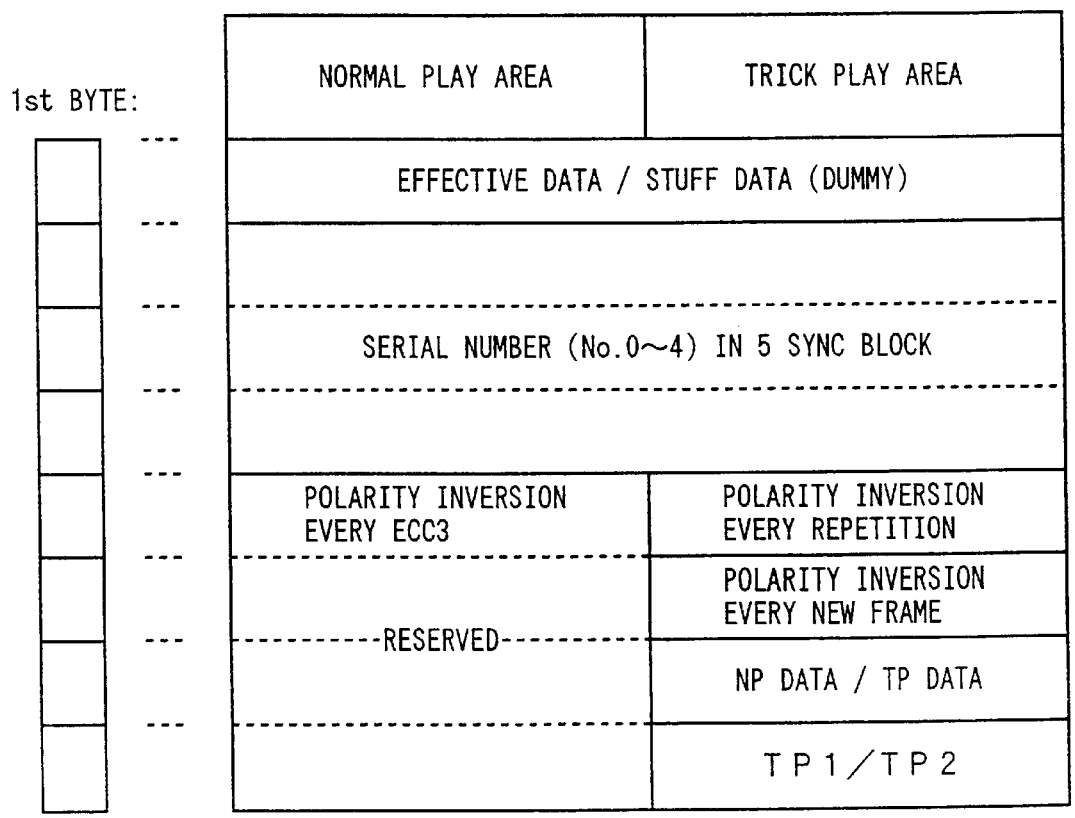
FIG. 5 illustrates the format of the extra header that is added to each sync block.

FIG. 5 illustrates in more detail the extra header added to each sync block. As indicated in FIG. 5, the extra header can be divided into a normal play area and a trick play area. These extra header bytes can include both data that is representative of a particular value (effective data) and data with no significance other than its ability to fill empty space (dummy data). Each extra header can include data relating to the identity of its corresponding sync block (serial number), polarity inversion data, normal play (NP) data, or trick play (TP) data. A portion of the extra header can be set aside as a reserved area.

The trick play area of the present invention is intended to improve the picture quality in the variable speed reproducing mode by serving as a reproducible area during variable speed reproduction. With respect to the MPEG2 format, which provides an I frame, P frame, and B frame, during variable speed reproduction, only the I frame data is used, and this I frame data is stored in the trick play area.

Namely, the recording rate of the digital VTR is set to 25 Mbps in the SD mode. On the other hand, when the transport packet is recorded at the rate of 10 Mbps, there is a surplus recording rate. Therefore, the reproducible area in the variable speed reproducing mode can be set to the trick play area and the packet including the I frame can be overlappingly recorded into the trick play area.

Figure 6:
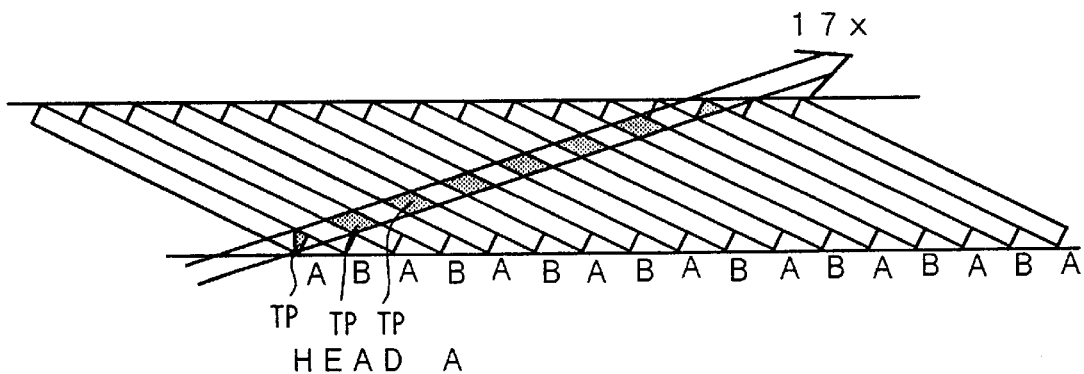
FIG. 6 illustrates the track locations of a plurality of trick play areas.
Figure 7:
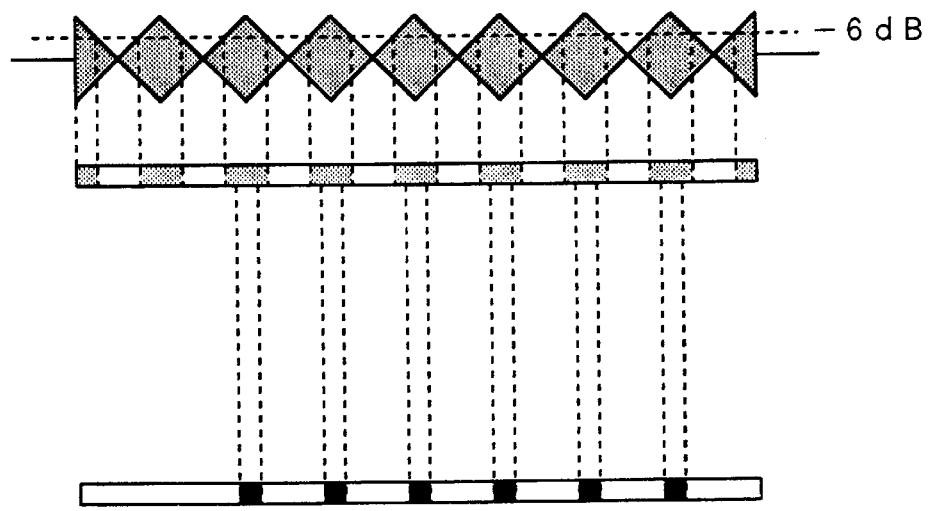
FIG. 7 illustrates a waveform diagram for explaining the trick play area.

For example, FIG. 6 shows the locus of a head as it passes over a plurality of recording tracks during the variable speed reproducing mode. The path of the head is illustrated in FIG. 6 as the arrow that extends diagonally across the plurality of tracks. Each shaded portion along this diagonal arrow corresponds to a trick play (TP) area. The reproducible area TP is used as the trick play area to record the packet for variable speed reproduction. In a VTR that uses helical scan and azimuth recording, the data that is reproduced from the TP area resembles a burst-like shape as shown in FIG. 7. By fixing the track-shaped positions in the reproducible area TP by an ATF (Automatic Track Following) operation, or the like, and recording the packet including the I frame into the reproducible area, the data of the I frame can be accurately reproduced.

According to an embodiment of the invention, two kinds of trick play areas, TP1 and TP2, are provided. One trick play area (TP1) is used for variable speed reproduction of a high speed. The other trick play area (TP2) is used for variable speed reproduction of a low speed. The trick play areas TP1 and TP2 are respectively provided in tracks of different azimuth angles.

Figure 8:
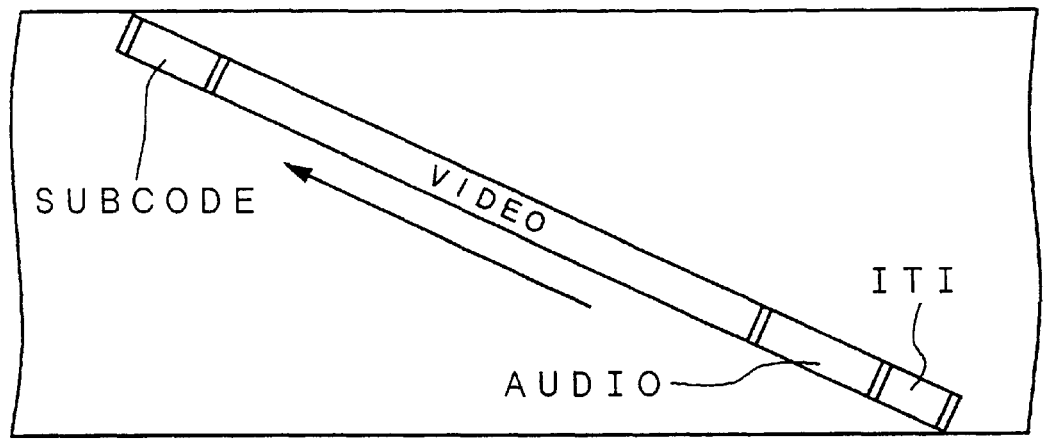
FIG. 8 illustrates the data format of an oblique track used in the present invention.

Namely, in the digital VTR, as shown in FIG. 8, each track is divided into four sectors: an ITI sector, which is used for post-recording operations or the like; an audio sector; a video sector; and a subcode sector, which is used during search operations or the like. The track is traced by heads of different azimuth angles. For example, two rotary heads may be arranged 180° apart, or a single head assembly with double azimuths can be used. A pilot signal is superimposed onto the track in order to permit ATF tracking.

Figure 9:
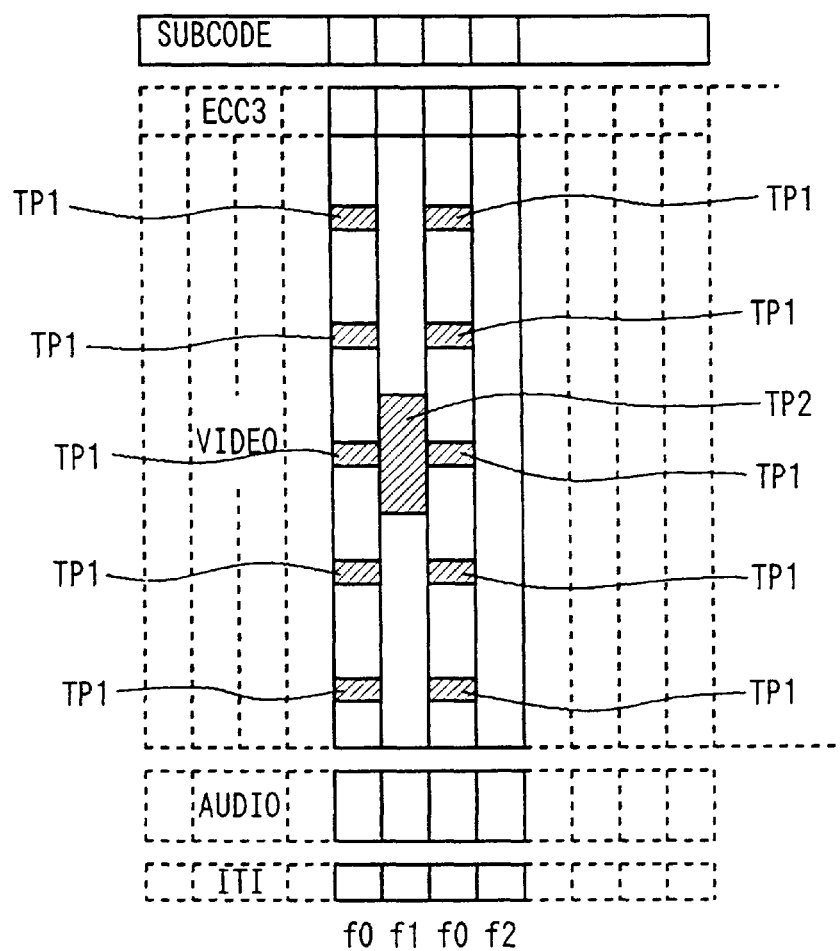
FIG. 9 illustrates the location of a plurality of trick play areas in relation to a plurality of pilot signals.

FIG. 9 illustrates two types of trick play areas, designated as TP1 and TP2, and their locations with respect to pilot signals f0 and f1. The video sectors of the tracks are alternately assigned pilot signals f0 or f1. Pilot signal f0 is incorporated within trick play area TP1, which the system of the present invention uses during high speed variable speed reproduction. Such high speed reproduction can occur, for example, at 18-times the normal reproduction speed. In the example of FIG. 9, data is respectively recorded 18 times in TP1. Pilot signal f1 is incorporated within trick play area TP2, which the system uses during low speed variable speed reproduction. Such low speed reproduction can occur, for example, at 4-times the normal reproduction speed. In trick play area TP2, data is repetitively recorded twice.

As mentioned above, the trick play areas TP1 and TP2 are arranged in the tracks of different azimuths, respectively. By using only the track of one azimuth in each of the trick play areas TP1 and TP2, the variable speed reproduction can be performed by using two heads arranged 180° apart, in a double-azimuth head arrangement without limiting the head construction.

During a phase lock operation of the digital VTR, tracking information is obtained from the tracks that include pilot signal f0. By relying on pilot signal f0 to obtain tracking information, the digital VTR renders the tracks with pilot signal f1 vulnerable to inaccuracies that may result from errors in mounting the heads to the rotating drums. To eliminate this vulnerability, the trick play area TP2 is arranged in the tracks that are associated with pilot signal f1. The trick play area TP1 for variable speed reproduction of the high speed is assigned to the tracks that are associated with pilot signal f0. The trick play area TP1 compensates for tracking deviations caused by the 4-times speed reproduction mode. These tracking deviations are larger than those caused by the 18-times speed reproduction mode.

Figure 11:
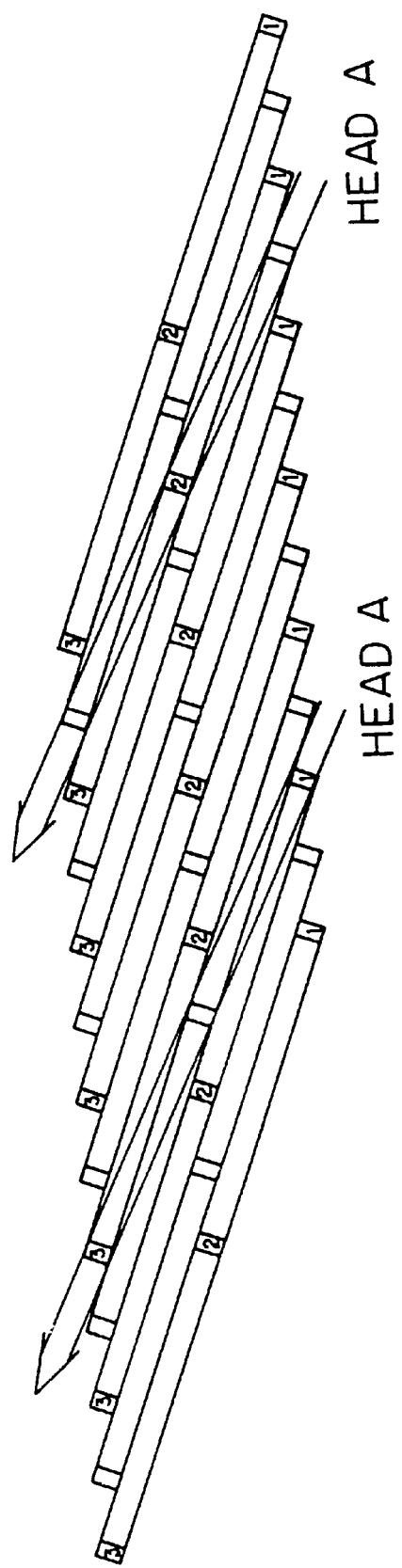
FIG. 11 shows the path of a reproducing head during a variable speed reproducing operation.

FIG. 10 illustrates the various tape speeds that can be realized in these two different variable speed reproducing modes. Namely, when the tape speed in the variable speed reproducing mode is set at (N+0.5)-times the normal reproducing speed (e.g., 1.5-times, 2.5-times, or 3.5-times the normal speed) as shown in FIGS. 11 and 12, all of the trick play portions of the tracks of the same azimuth can be reproduced in two scans. Namely, FIG. 11 shows the case where the maximum variable reproducing speed is set to 7-times the normal reproduction speed and the variable speed reproduction is executed at 3.5-times the normal reproduction speed. In this case, as shown in FIG. 12A, the portions at both ends of the track of the azimuth A are reproduced by the first scan, and the center portion of the track of the azimuth A is reproduced by the second scan. Thus, these two scanning operations result in the scanning of one track. By repetitively recording the same trick play data to each track of the azimuth A, all of the data on one track of the tracks of the azimuth A can be reproduced by two such scans. Therefore, by repetitively recording the trick play data to the tracks of the same azimuth, the variable speed reproduction of the trick play data can be assured at (N+0.5)-times the normal reproducing speed (e.g., 1.5-times speed, 2.5-times speed, or 3.5- times speed).

FIGS. 13A and 13B show an arrangement of the sync blocks in each track. Every track includes a reserved error correction code (ECC) comprising nine sync blocks. Further, as shown in FIG. 13A, the normal play area and the trick play area TP1 are provided in track T0. The normal play area and the trick play area TP2 are provided in track T1. The normal play area and the trick play area TP1 are provided in track T2. Only the normal play area is provided in track T3. The trick play areas TP1 and TP2 are not provided in track T3, which includes only the normal play area.

Trick play areas TP1 and TP2 each comprise up to 25 sync blocks. The normal play areas may comprise up to 101 sync blocks. As shown in FIG. 4, a good matching among the trick play areas is achieved when the number of sync blocks in the trick play areas TP1 and TP2 equals a number that is a multiple of 5, since the data of two packets are packed to five sync blocks.

FIG. 13B illustrates tracks T0 to T3. The designations "18×" and "5×" refer to the particular reproduction speed of the corresponding track. For example, "18×" indicates that track T0 is reproduced 18 times the normal reproduction speed. All the tracks include an error correction code (ECC) of 9 sync blocks. Tracks T0–T2 each include a trick play area of 25 sync blocks, but track T3 does not include any sync blocks in its trick play area. Each sync block in each trick play area of tracks T0–T2 is assigned a number. Tracks T0 and T2 include sync blocks that are numbered 40–44, 62–66, 84–88, 106–110, and 128–132. Track T1 includes sync blocks that are numbered 38–62.

During variable high speed reproduction of trick play area TP1, the head is set at a position that permits the subcode sector and the ITI sector of a track to be read. Thus, the subcode can be accessed during variable speed reproduction, even when the production speed occurs at 18-times the normal reproduction speed. At 18-times the normal reproduction speed, the duration of a data burst is too short for the tracking error signal to perform an ATF control. By scanning the ITI sector, however, the desired ATF control can be performed. When reproducing the ITI sector, a pilot signal with a high S/N ratio can be obtained from another data area. Since the duration of a data burst becomes long at 4-times the normal speed of reproduction, the ATF control can be performed in the data area. Therefore, the trick play area TP2 for variable low reproduction speed is arranged at a position where the subcode can be read.

FIG. 14 shows a first embodiment of an apparatus for recording variable speed reproduction data into trick play areas TP1 and TP2, which are intended to be reproduced during a variable speed reproduction mode. In FIG. 14, an MPEG2 transport packet is supplied to an input terminal 51. The transport packet is supplied to a buffer 52 for rate conversion and to a TS/PES decoder 53. Now, assuming that the data rate of the inputted transport packet is equal to, for example, 30 Mbps, rate converting buffer 52 converts the data rate to, for instance, 10 Mbps. In the case where a plurality of programs are time divisionally multiplexed and transmitted as multiprograms, a desired one of those programs is selected and the selected program is supplied to the buffer 52 for rate conversion.

The TS/PES decoder 53 decodes the received transport packet and extracts the video data from the payload portion of the transport packet. An output of the TS/PES decoder 53 is supplied to a start code analyzing circuit 54. The start code analyzing circuit 54 judges whether the packet is to be reproduced in accordance with a subsequently selected variable speed reproduction mode. This judgment is based on the information contained in the header of the transport packet. Namely, this judgment is a determination of whether the packet is one of high significance. This determination detects the presence of the I frame based on information (such as a transport priority or the like) found in the header of the transport packet. The packet including the I frame is judged as a packet necessary for variable speed reproduction. An output of the start code analyzing circuit 54 is supplied to TP processing circuit 55. An output of the TP processing circuit 55 is supplied to TS/PES packet forming circuits 56A and 56B. The TS/PES packet forming circuit 56A generates a packet to be recorded into the trick play area TP1, which is used for variable high speed reproduction. The TS/PES packet forming circuit 56B generates a packet to be recorded into trick play area TP2, which is used for variable low speed reproduction. The data that is recorded in the trick play areas TP1 and TP2 are not associated with MPEG2 (or DCT) coefficients of a high frequency range. Outputs of the TS/PES packet forming circuits 56A and 56B are supplied to a TP1 buffer 57A and a TP2 buffer 57B, respectively.

Outputs of the rate converting buffer 52, TP1 buffer 57A, and TP2 buffer 57B are supplied to multiplexer 58 through sync block (SB) formatters 59A, 59B, and 59C, respectively. These sync block (SB) formatters can also be omitted from the apparatus of FIG. 14 (as well as from the apparatus of FIG. 15). SB formatters 59A–59C organize the data in the manner depicted in FIG. 4. The output of multiplexer 58 is supplied to a recording mechanism (not shown). The output of the rate converting buffer 52 is recorded in the aforedescribed normal play area. The output of the TP1 buffer 57A is recorded in the trick play area TP1. The output of the TP2 buffer 57B is recorded in the trick play area TP2.

FIG. 15 shows a second embodiment of an apparatus for recording data into trick play areas TP1 and TP2, which are intended to be reproduced during variable speed reproduction. In the example shown in FIG. 14, trick play area TP1 (which is used during variable high speed reproduction) and trick play area TP2 (which is used during variable low speed reproduction) are individually processed by the TS/PES packet forming circuits 56A and 56B and the TP1 buffer 57A and TP2 buffer 57B, respectively. However, in the apparatus of FIG. 15, trick play area TP1 and trick play area TP2 are processed by a single circuit, namely, TS/PES packet forming circuit 56. The output of TS/PES packet forming circuit is supplied to TP1/TP2 buffer 57. The apparatus of FIG. 15 records the I frame in trick play area TP1 more quickly than in trick play area TP2. Therefore, dummy data is recorded until the end of the recording of the trick play area TP1. To facilitate this process, the number of sync blocks of the trick play areas TP1 and TP2 in respective tracks are made equal at 25 sync blocks. The outputs of rate converting buffer 52 and TP1/TP2 buffer 57 are supplied to multiplexer 58 through SB formatters 59A and 59B, which organize the data to be formatted in accordance with the format of FIG. 4.

Figure 16:
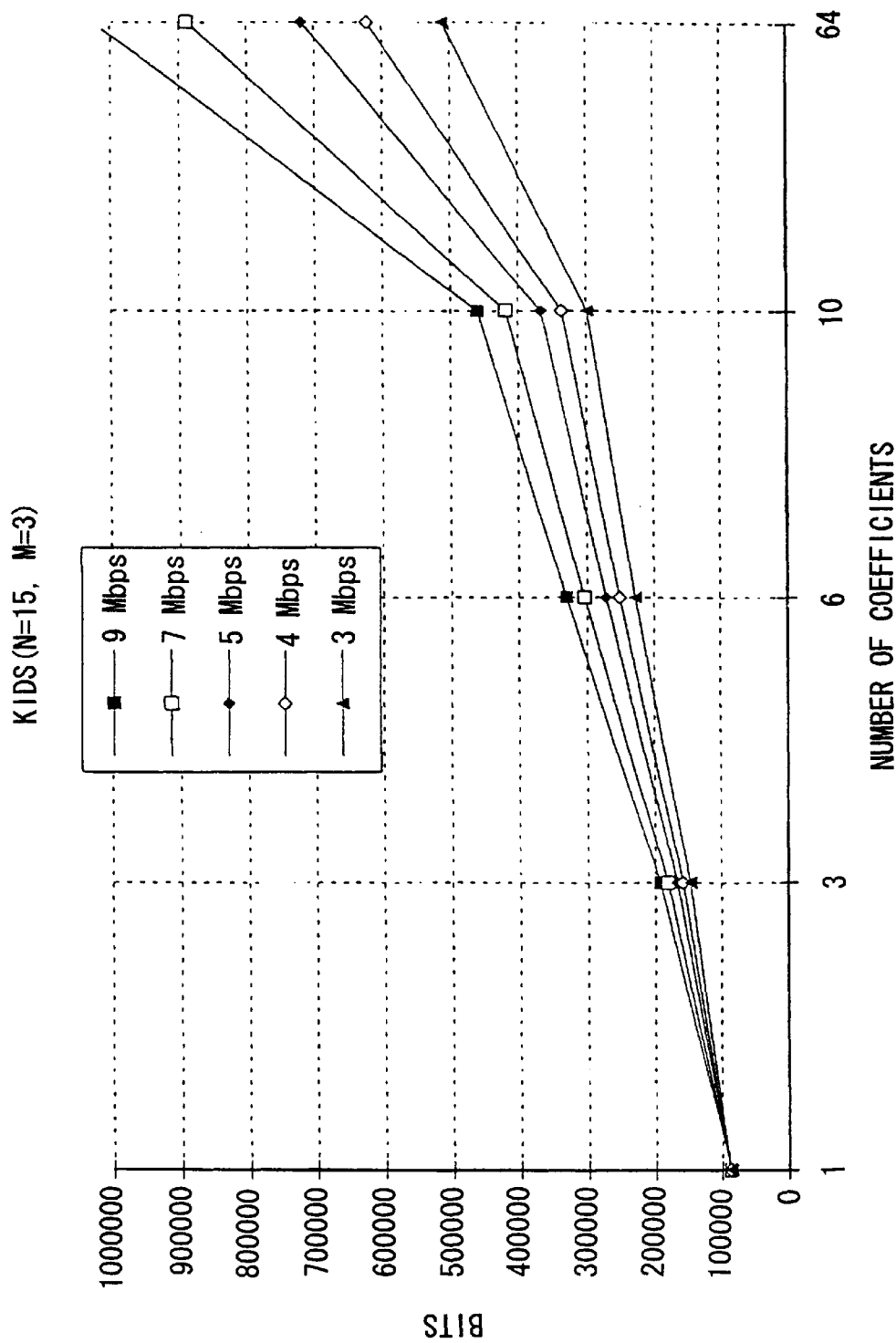
FIG. 16 is a graph that illustrates a relationship between the amount of high frequency coefficients in the variable speed recording data and the corresponding memory size (expressed in bits) needed to store such recording data.

In the above example, the data for the variable speed reproduction is recorded in the trick play area without deleting the high frequency coefficients. As mentioned above, since the amount of data is large, when the extracted I frame picture is directly used as variable speed reproduction data without eliminating the high frequency coefficients, an updating ratio of the reproduced image deteriorates and a memory with a large capacity is needed to store the data. That is, FIG. 16 shows the relation between the number of coefficients (abcissa) and the data amount (ordinate). From FIG. 16, for instance, when the coefficients are reduced to six, a memory size of 500 k bits is sufficient to store the reproduced data. However, when the number of coefficients equals 64, a 1 Mbit memory is necessary to store the corresponding data.

Upon reproduction, only the data in the variable speed reproduction area is extracted from the reproduction data and sent to the decoder. However, during reverse variable speed reproduction, the data of the I frame cannot be easily decoded in the same manner. Therefore, the data of one picture is stored in the buffer memory, and the data is transmitted in the same form as in the case of the forward direction by reading out the data from the packet at the head of the picture. In this case as well, a buffer memory with a size corresponding to one picture (which corresponds to variable speed reproduction data) is needed.

Figure 17:
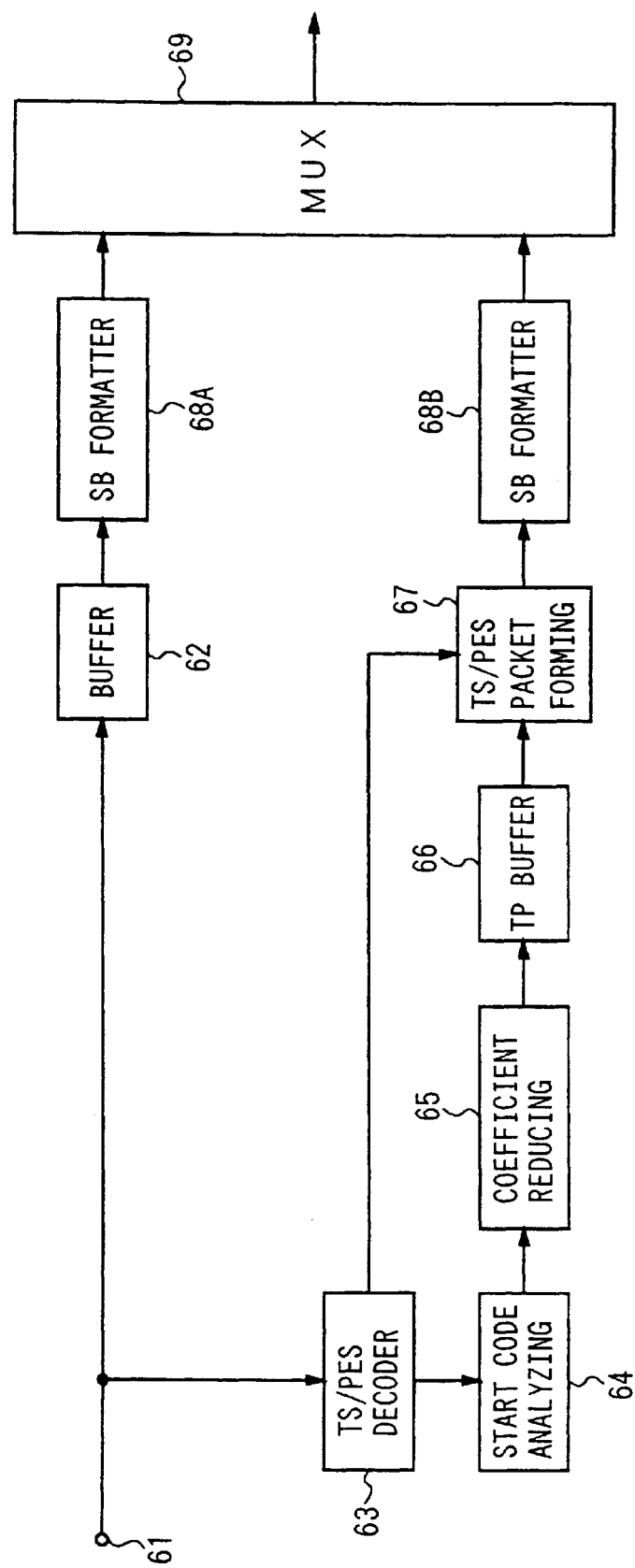
FIG. 17 illustrates a third embodiment of an apparatus for recording variable speed reproduction data into trick play areas.

It is, therefore, more practical to delete the high frequency coefficients and then record the resultant data. FIG. 17 illustrates a third embodiment of a data recording apparatus, in which high frequency coefficients are stripped from the recording data. Namely, as shown in FIG. 17, the packet from an input terminal 61 is supplied to a buffer 62 and to a TS/PES decoder 63. An output of the TS/PES decoder 63 is supplied to a start code analyzing circuit 64 which obtains the I picture from the received signal. The start code analyzing circuit 64 supplies the extracted I picture to a coefficient reducing circuit 65. The coefficient reducing circuit 65 deletes the high frequency coefficients of the I picture. Having been stripped of its high frequency coefficients, the I picture data is then stored in a buffer memory 66. This stored data is referred to as the variable speed reproduction data. The data in the buffer memory 66 is sent to a TS/PES packet forming circuit 67, which divides the data again into packets.

The data for normal reproduction stored in the buffer 62 and the data for variable speed reproduction from the TS/PES packet forming circuit 67 are sent to sync block formatters 68A and 68B and headers are added to the data. The resultant data is sent to a multiplexer 69.

The coefficient reducing circuit 65 uses a VLD (variable length decoding) process to delete the high frequency coefficients of each block from the I picture. However, in the MPEG2 format, the variable length decoding arrangement is fairly large because no byte alignment is performed in the layers subsequent to the slice layer. Therefore, as shown in FIG. 16, a memory with an excessively large storage capacity needs to be used in conjunction with the variable length decoding performed by coefficient reducing circuit 65.

In order to remedy this problem, only a portion of the I picture is recorded during every recording operation (or sequence), even though the entire data contents of the I picture have been converted to variable speed reproduction data by coefficient reducing circuit 65. Such a portion may comprise, for example, only the upper third portion of the picture plane. In the next recording operation, the middle third portion of the picture plane is recorded. The bottom third portion is then recorded in the next subsequent recording operation. In this manner, the memory size of buffer 66 can be reduced by recording a picture plane a portion at a time.

Figure 18:
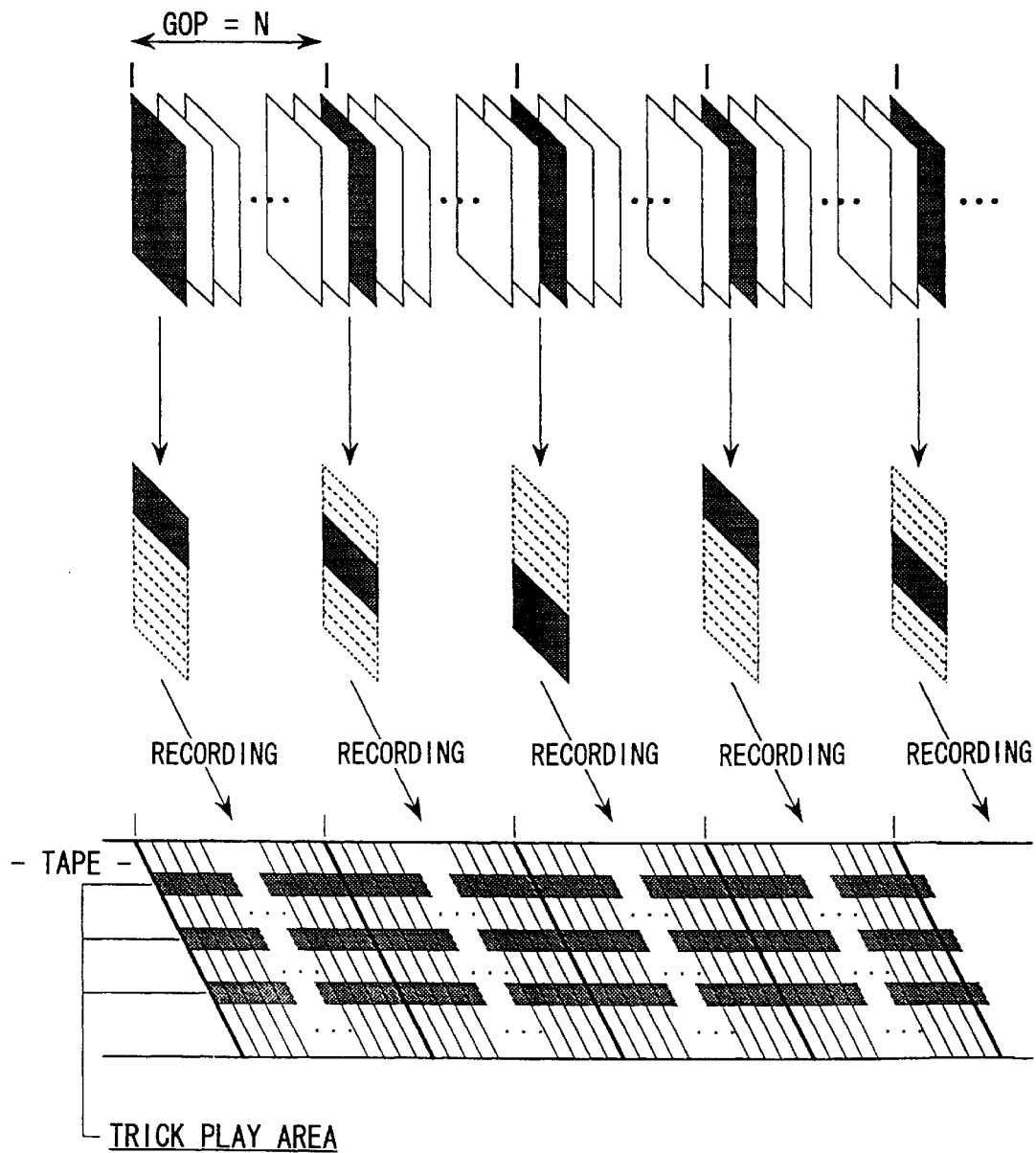
FIG. 18 illustrates a procedure for dividing a picture plane.

FIG. 18 illustrates a recording operation in which a picture plane is divided into thirds, and each portion is consecutively recorded. In FIG. 18, data corresponding to the upper ⅓ portion of the picture plane is stored in a memory. This data comprises variable speed reproduction data, which is recorded into the trick play area. Subsequently, the data of the portion corresponding to the middle ⅓ of the picture plane is extracted and stored in the memory. This variable speed reproduction data is then recorded into the trick play area. Next, the data of the portion corresponding to the lower ⅓ of the picture plane is extracted and stored in the memory. This data is then recorded into the trick play area. Thus, the data of the upper ⅓, middle ⅓, and lower ⅓ of the picture plane are sequentially stored in the memory and recorded into the trick play area. By using such a method, a memory with a storage capacity that is ⅓ of the capacity necessary to store the entire picture plane can be used in the present invention.

The area on the picture plane can be known by counting the slice vertical position in the slice header. The last slice number is stored and the data corresponding to ⅓ of the picture plane is taken out from the next slice. After that, by repeating such a process, the data can be recorded as variable speed reproduction data every ⅓ of the picture plane.

Although the picture plane has been divided into three areas in this example, the picture plane can be divided into as many portions as is necessary, given the capacity of the buffer memory or the like. Stuffing bytes are used when the picture plane cannot be evenly divided into portions of equal size. When using stuffing bytes, the present invention can indicate their presence by inserting flag data into the header.

Figure 19:
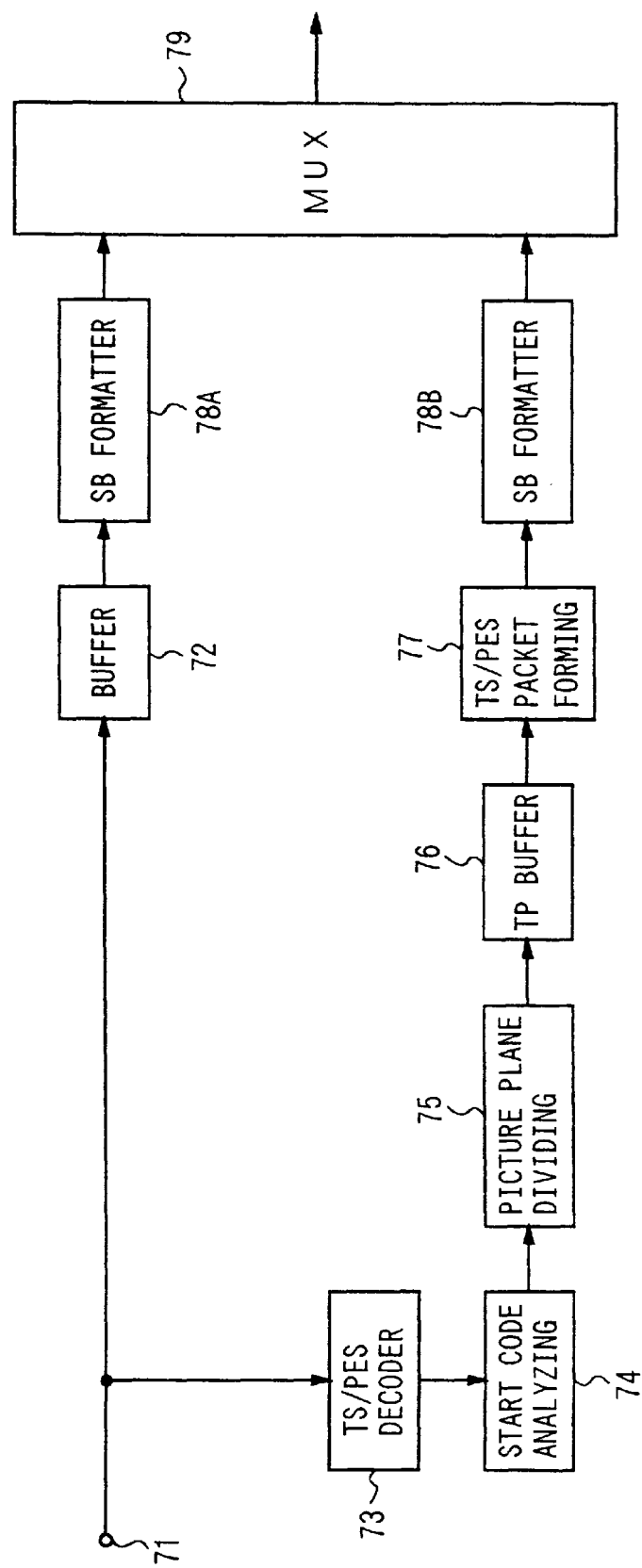
FIG. 19 illustrates a fourth embodiment of an apparatus for recording variable speed reproduction data into trick play areas.

FIG. 19 illustrates an apparatus that implements the above-described picture plane dividing scheme. In FIG. 19, a packet from an input terminal 71 is supplied to a buffer 72 and to a TS/PES decoder 73. An output of the TS/PES decoder 73 is supplied to a start code analyzing circuit 74. The I picture is extracted from the start code analyzing circuit 74. An output of the start code analyzing circuit 74 is supplied to a picture plane dividing unit 75.

Figure 20:
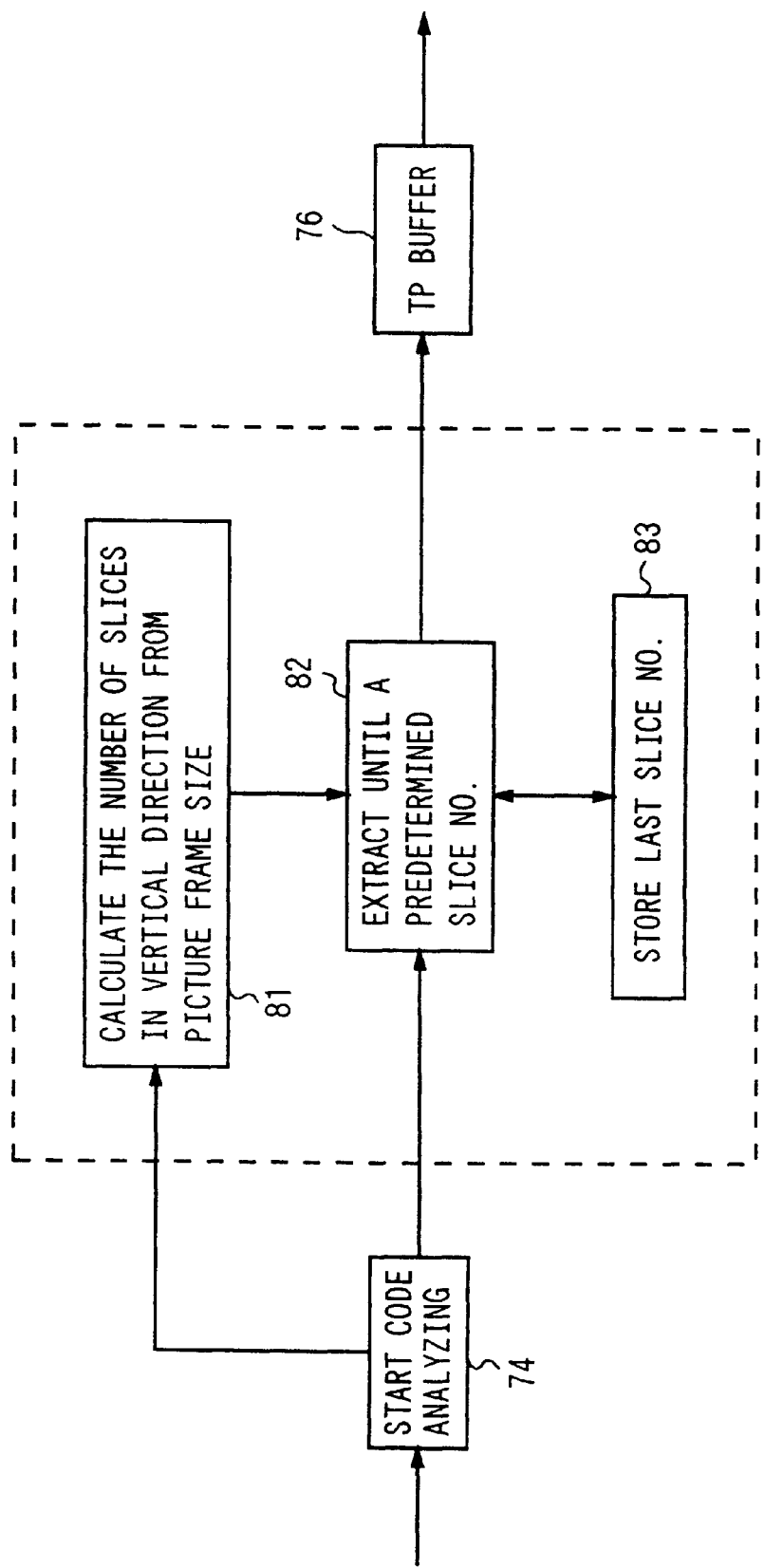
FIG. 20 is a diagram for explaining the dividing of the picture plane.

As shown in FIG. 20, the picture plane dividing unit 75 counts the slice vertical positions in the slice header and calculates the number of slices in the vertical direction (block 81) and extracts the I picture data up to a predetermined slice number (block 82). The last slice number is stored (block 83). In the next area, the extraction of the I picture data is executed from the next slice number.

The data in the area extracted by the picture plane dividing unit 75 is stored in a buffer memory 76. The data in the buffer memory is sent to a TS/PES packet forming circuit 77 and is again divided into packets. The data used for a normal reproduction operation, which is stored in the buffer 72, and the data for the variable speed reproduction from the TS/PES packet forming circuit 77 are respectively sent to sync block formatters 78A and 78B and headers are added to them. The resultant data is sent to a multiplexer 79.

By combining the technique of storing the data in the memory for every ⅓ of the picture plane and the technique of reducing the high frequency coefficients, the memory capacity can be further reduced.

Figure 21:
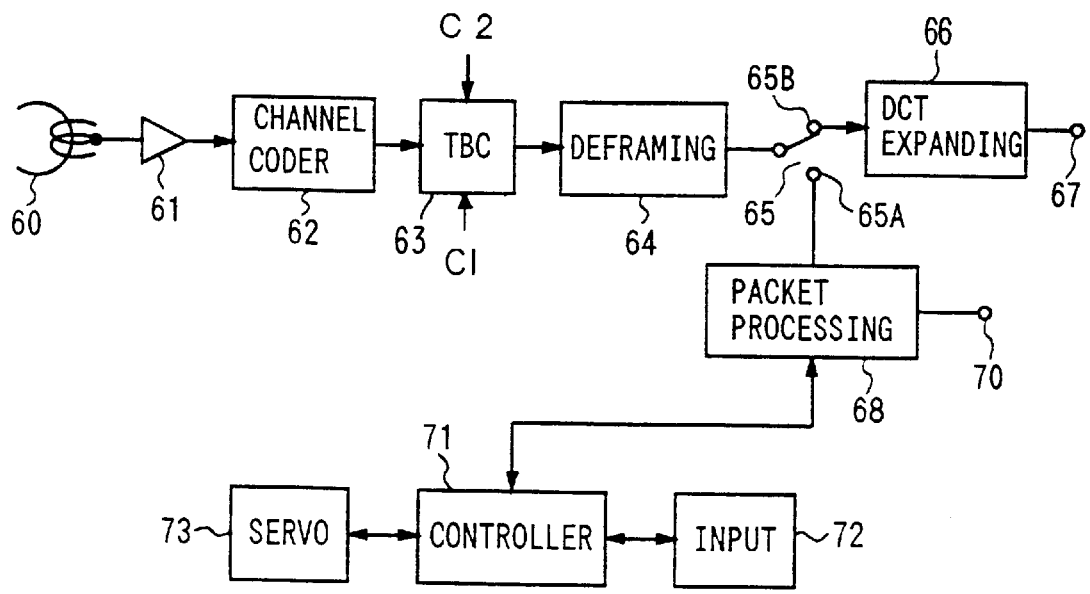
FIG. 21 illustrates a digital VTR reproducing system of the present invention.
Figure 24:
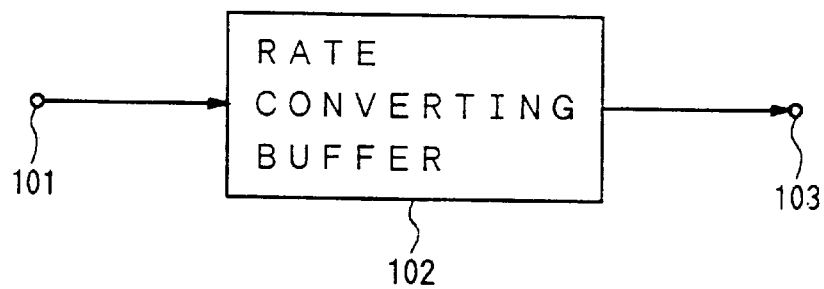
FIG. 24 illustrates a rate converting buffer for use in the present invention.
Figure 22A:
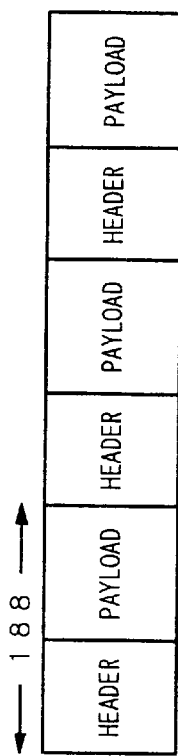
FIGS. 22A–22D are schematic diagrams for use in explanation of the transport packet.
Figure 22B:
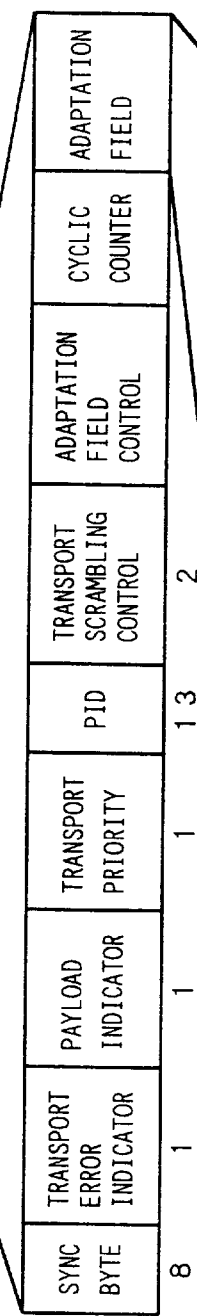
Figure 22C:
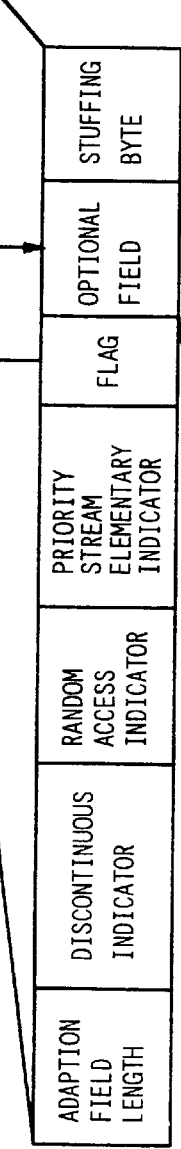
Figure 22D:
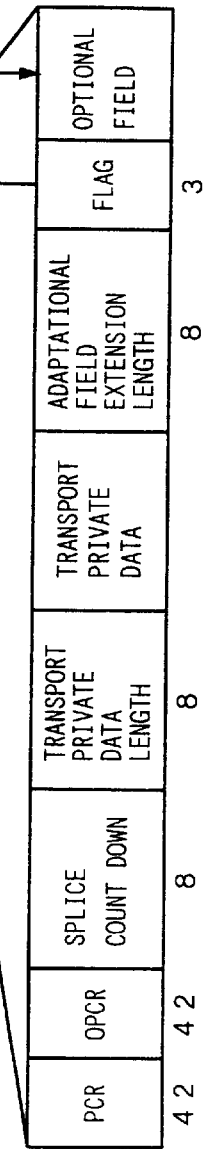
Figures 23A, 23B:
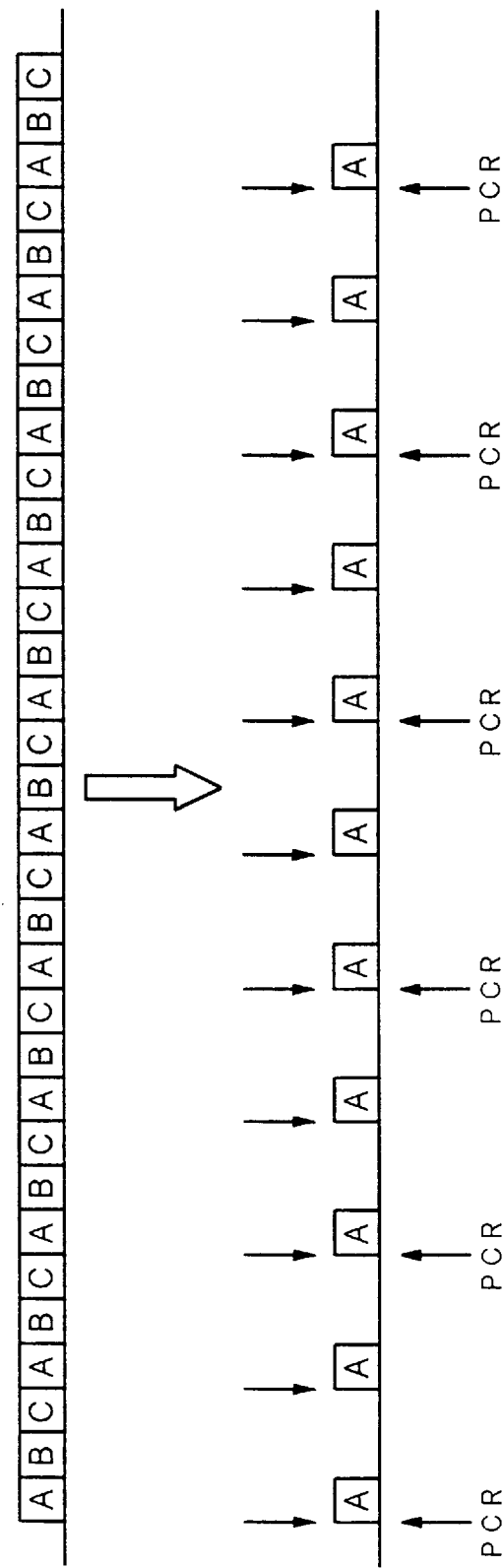
FIGS. 23A and 23B illustrate the selection of one transport packet program for recording from a plurality of multiplexed programs.

FIG. 21 illustrates a reproducing system of the present invention. In FIG. 21, the signal recorded on a magnetic tape is reproduced by a rotary head 60 and is supplied to a channel coder 62 through a reproducing amplifier 61. The channel coder 62 demodulates the reproduction signal.

The output of channel coder 62 is supplied to a TBC (Time Base Corrector) 63. The TBC 63 is provided to eliminate time base fluctuations of the reproduced signal. A clock synchronized to the reproduced signal and a clock synchronized to a reference signal are supplied to the TBC 63.

An output of the TBC 63 is supplied to a deframing circuit 64. The deframing circuit 64 reverses the framing operation performed by frame forming circuit 5 of the recording system, and it executes an error deciding process or the like.

Deframing circuit 64 supplies its output to switching circuit 65, which is switched to terminal 65A when the reproduced signal is the MPEG2 transport packet, and which is switched to terminal 65B when the apparatus of FIG. 21 reproduces a component signal.

DCT expanding circuit 66 reverses the compression performed on the digital data by DCT compressing circuit 3, which is part of the recording system. Namely, DCT circuit 66 decodes the variable length code and executes an inverse DCT conversion, thereby returning the compressed video signal to its original non-compressed state. An output of the terminal 65B of the switching circuit 65 is supplied to the DCT expanding circuit 66. An output of the DCT expanding circuit 66 is taken out from an output terminal 67.

When switch 65 is switched to terminal 65A, the output of deframing circuit 64 is supplied to packet processing circuit 68. The packet processing circuit 68 includes a rate conversion buffer, which converts the reproduced MPEG2 transport packet of, for example, 10 Mbps to the original rate. In addition, the packet processing circuit 68 detects the time base information consisting of three bytes which was added to the head of the packet. Upon reproduction, the rotation of the drum is synchronized with the reference clock similar to that upon recording. Therefore, the time base state that was used for recording can be perfectly reconstructed.

Upon variable speed reproduction, the system determines whether the reproduced packet includes the I frame or not. Only the packet including the I frame is processed. An output of the packet processing circuit 68 is outputted through output terminal 70 to other circuitry (not shown) for reproducing the decoded signal.

Packet processing circuit 68 is in communication with controller 71, which causes the packet processing circuit to switch between a normal reproduction mode and a variable speed reproduction mode. A mode setting signal supplied to controller 71 from input unit 72 sets a servo circuit 73 and the packet processing circuit 68 to the selected reproduction mode. When the variable speed reproduction is executed on the basis of the data of the transport packet, phase control and speed control are executed by the servo circuit 73 by using ATF tracking control. Thus, the trick play areas TP1 and TP2 are reproduced.

In the above example, although one program at a rate of 30 Mbps is selected from the plurality of input multiplexed programs and recorded, the present invention can record to the digital VTR all the multiplexed programs when the total transmission rate of the programs is on the order of 25 Mbps. The following discussion describes the various variable speed reproducing processes that are used in this situation:

The program A is selected and the I frame included therein is recorded into the trick play area. Program B is then selected, the I frame included therein recorded into the trick play area. Subsequently, the program C is selected and recorded in the same manner as Programs A and B.

During variable speed reproduction of, for example, program A, the image data of program A is reproduced and then, while the dummy data associated with program A is processed, the system at the same time extracts the data of another program.

The variable speed reproduction operation is also applicable to reproduce a scrambled bit stream. Namely, upon encoding, one bit is prepared for the header portion of the transport packet upon encoding, thereby indicating whether the I frame is included in that packet. Upon recording, such a header is checked and the packet including the I frame is directly recorded. The remaining data, other than the header, is scrambled. Thus, the high frequency coefficients cannot be eliminated. Upon reproduction, the data of the trick play area is recovered and descrambled by the decoder and a variable speed reproduced image can be seen.

What is claimed is:

1. A digital data recording apparatus for recording a data packet onto a tape, comprising:
   a reference clock;
   time generating means, in communication with said reference clock, for generating on the basis of said reference clock a time when said data packet arrives at said apparatus;
   means in communication with said time generating means for adding the arrival time of said data packet to said data packet;
   classifying means for classifying each of a plurality of tracks on the tape into a plurality of normal play areas and a plurality of trick play areas, each of said trick play areas being located at positions of each of said tracks corresponding to locations of each of said tracks that are traced by a head during a variable speed reproducing operation; and
   recording means in communication with said adding means for recording said data packet into said normal play areas and for recording into said trick play areas only a portion of said data packet, said portion of said data packet recorded into said trick play areas including the arrival time of said data packet and being reproduced during said variable speed reproducing operation.

2. A digital data recording apparatus according to claim 1, further comprising rate converting means in communication with said recording means for rate converting the data packet to be recorded.

3. A digital data recording apparatus according to claim 1, further comprising sync block formatting means in communication with said recording means for arranging every n data packets into a sync block, wherein n is an integer.

4. A digital data recording apparatus according to claim 1, wherein said recording means comprises a recording head attached to a rotating drum, wherein said rotating drum is rotated synchronously with said reference clock.

5. A digital data recording apparatus according to claim 1, wherein said trick play areas comprise a first trick play area for high variable speed reproduction and a second trick play area for low variable speed reproduction, and said first trick play area for high variable speed reproduction and said second trick play area for low variable speed reproduction are arranged in tracks of different azimuths, respectively.

6. A digital data recording apparatus according to claim 1, wherein said first trick play area for high variable speed reproduction is recorded in tracks from which tracking information is obtained by an ATF operation.

7. A digital data recording apparatus according to claim 1, wherein said data packet comprises picture information, and said apparatus further comprises:
   picture dividing means in communication with said classifying means for dividing said picture information into a plurality of picture portions; and
   memory means in communication with said picture dividing means and with said recording means for consecutively storing each of said plurality of picture portions, wherein said plurality of picture portions are recorded in said trick play areas.

8. A digital data recording apparatus according to claim 1, further comprising coefficient reducing means in communication with said recording means for reducing high frequency coefficients of said data packet.

9. A digital data recording method of recording a data packet onto a tape, comprising the steps of:
   generating, on the basis of a reference clock, a time when said data packet arrives at a digital data recording apparatus;
   adding the arrival time of said data packet to said data packet;
   classifying each of a plurality of tracks on the tape into a plurality of normal play areas and a plurality of trick play areas, said trick play areas being located at positions of each of said tracks corresponding to track locations that are traced by a head during a variable speed reproducing operation; and
   recording said data packet into said normal play area and recording into said trick play areas only a portion of said data packet, said portion of said data packet recorded into said trick play areas including the arrival time of said data packet and being reproduced during said variable speed reproduction operation.

10. A digital data recording method according to claim 9, further comprising the step of rate converting said data packet prior to the recording thereof.

11. A digital data recording method according to claim 9, wherein every n data packets are arranged into a sync block, and wherein n is an integer.

12. A digital data recording method according to claim 9, wherein a drum of said data recording apparatus is rotated synchronously in accordance with said reference clock.

13. A digital data recording method according to claim 9, wherein said trick play areas comprise a first trick play area for high variable speed reproduction and a second trick play area for low variable speed reproduction, and wherein said first trick play area for high variable speed reproduction and said second trick play area for low variable speed reproduction are recorded in tracks of different azimuths, respectively.

14. A digital data recording method according to claim 9, wherein said first trick play area for high variable speed reproduction is recorded in tracks from which tracking information is obtained by an ATF operation.

15. A digital data recording apparatus for recording sync blocks onto a tape having a plurality of tracks, comprising:

means for receiving a plurality of data packets;

classifying means for classifying each of said tracks on the tape into a plurality of normal play areas and a plurality of trick play areas, each of said trick play areas being located at positions on each of said tracks corresponding to locations that are traced by a head during a variable speed reproducing operation;

sync block formatting means for arranging n data packets into m sync blocks; and recording means for recording said sync blocks into said normal play areas and for recording selected ones of said sync blocks into said trick play areas, said selected sync blocks recorded in said trick play areas being reproduced during said variable speed reproducing operation.

16. The digital data recording apparatus of claim 15, wherein said recording means is operable to record the same selected sync blocks a plurality of times in said plurality of trick play areas of a track.

17. The digital data recording apparatus of claim 15, wherein said recording means includes a recording head attached to a rotating drum; said apparatus further comprising means for reproducing said sync blocks from said tracks; and means for controlling the rotation of said rotating drum in accordance with an arrival time of said data packets arranged in the reproduced sync blocks.

18. A digital data recording apparatus for recording data packets onto a tape having a plurality of tracks, comprising:

means for receiving a plurality of data packets;

classifying means for classifying each of said tracks on the tape into a plurality of normal play areas and a plurality of trick play areas, each of said trick play areas on alternating tracks being located at positions corresponding to locations of said respective tracks that are traced by a first head during a first variable speed reproducing operation, each of said trick play areas on the other alternating tracks being located at positions corresponding to locations of said respective tracks that are traced by a second head during a second variable speed reproducing operation, said locations on said alternating tracks being different from said locations of the other alternating tracks; and recording means for recording said data packets into said normal play areas and for recording into said trick play areas only a portion of said data packets, said portion of said data packets recorded in said trick play areas of said alternating tracks being reproduced during said first variable speed reproducing operation, and said portion of said data packets recorded in said trick play areas of the other alternating tracks being reproduced during said second variable speed reproducing operation.

19. The digital data recording apparatus of claim 18, wherein said recording means is operable to record the same portion of said data packets a plurality of times in said plurality of trick play areas of a track.

20. The digital data recording apparatus of claim 18, wherein said recording means includes a recording head attached to a rotating drum; said apparatus further comprising means for reproducing said data packets from said tracks; and means for controlling the rotation of said rotating drum in accordance with an arrival time of said data packets.

21. A digital data recording method of recording sync blocks onto a tape having a plurality of tracks, comprising the steps of:

receiving a plurality of data packets;

classifying each of said tracks on the tape into a plurality of normal play areas and a plurality of trick play areas, each of said trick play areas being located at positions on each of said tracks corresponding to locations that are traced by a head during a variable speed reproducing operation;

arranging n data packets into m sync blocks; and recording said sync blocks into said normal play areas and recording selected ones of said sync blocks into said trick play areas, said selected sync blocks recorded in said trick play areas being reproduced during said variable speed reproducing operation.

22. The digital data recording method of claim 21, wherein said recording step is carried out by recording the same selected sync blocks a plurality of times in said plurality of trick play areas of a track.

23. The digital data recording method of claim 21, further comprising the steps of reproducing the sync blocks from said tracks using a reproducing head; and controlling the rotation of a drum on which the reproducing head is attached in accordance with an arrival time of said data packets arranged in the reproduced sync blocks.

24. A digital data recording method of recording data packets onto a tape having a plurality of tracks, comprising the steps of:

receiving a plurality of data packets;

classifying each of said tracks on the tape into a plurality of normal play areas and a plurality of trick play areas, each of said trick play areas on alternating tracks being located at positions corresponding to locations of said respective tracks that are traced by a first head during a first variable speed reproducing operation, each of said trick play areas on the other alternating tracks being located at positions corresponding to locations of said respective tracks that are traced by a second head during a second variable speed reproducing operation, said locations on said alternating tracks being different from said locations of the other alternating tracks; and recording said data packets into said normal play areas and recording into said trick play areas only a portion of said data packets, said portion of said data packets recorded in said trick play areas of said alternating tracks being reproduced during said first variable speed reproducing operation, and said portion of said data packets recorded in said trick play areas of the other alternating tracks being reproduced during said second variable speed reproducing operation.

25. The digital data recording method of claim 24, wherein said recording step is carried out by recording the same portion of said data packets a plurality of times in said plurality of trick play areas of a track.

26. The digital data recording method of claim 24, further comprising the steps of reproducing said data packet from said tracks using a reproducing head; and controlling the rotation of a drum on which the reproducing head is attached in accordance with an arrival time of said data packets.

* * * * *